(12) United States Patent
Wolfe

(10) Patent No.: US 11,958,404 B2
(45) Date of Patent: Apr. 16, 2024

(54) WARNING INDICATOR SYSTEM AND RELATED METHODS

(71) Applicant: Kodiak Robotics, Inc., Mountain View, CA (US)

(72) Inventor: Thomas Wolfe, Vestavia, AL (US)

(73) Assignee: KODIAK ROBOTICS, INC., Mountain View, CA (US)

( * ) Notice: Subject to any disclaimer, the term of this patent is extended or adjusted under 35 U.S.C. 154(b) by 0 days.

(21) Appl. No.: 17/869,711

(22) Filed: Jul. 20, 2022

(65) Prior Publication Data
US 2024/0025337 A1 Jan. 25, 2024

(51) Int. Cl.
*B60Q 1/50* (2006.01)
*B60Q 1/26* (2006.01)

(52) U.S. Cl.
CPC ........... *B60Q 1/507* (2022.05); *B60Q 1/2696* (2013.01); *B60Q 1/547* (2022.05); *B60Q 2400/20* (2013.01)

(58) Field of Classification Search
CPC ...... B60Q 1/507; B60Q 1/2696; B60Q 1/547; B60Q 2400/20
See application file for complete search history.

(56) References Cited

U.S. PATENT DOCUMENTS

| | | | |
|---|---|---|---|
| 2017/0240098 A1 | 8/2017 | Sweeney et al. | |
| 2019/0168664 A1* | 6/2019 | Tatara | B60Q 5/006 |
| 2020/0047664 A1* | 2/2020 | Ellis | B60Q 1/5035 |
| 2020/0282902 A9* | 9/2020 | Mazzola | B60Q 1/488 |
| 2020/0349836 A1* | 11/2020 | Shibata | G08G 1/0965 |
| 2022/0144185 A1 | 5/2022 | Burnette et al. | |

OTHER PUBLICATIONS

U.S. Appl. No. 17/826,000, filed May 26, 2022.
U.S. Appl. No. 17/869,712, filed Jul. 20, 2022.
Notice of Allowance mailed Aug. 17, 2023, directed to U.S. Appl. No. 17/869,712; 14 pages.

* cited by examiner

*Primary Examiner* — Omeed Alizada
(74) *Attorney, Agent, or Firm* — Michele V. Frank; Venable LLP

(57) ABSTRACT

A warning indicator system for an autonomous vehicle includes a sensor pod, a connecting assembly, and a warning indicator. The sensor pod has a sensor and a sensor pod housing. The connecting assembly is configured to couple the sensor pod to the autonomous vehicle. The warning indicator is associated with the sensor pod and the connecting assembly. The warning indicator is configured to alert other vehicles and persons to a stopped condition of the autonomous vehicle. An autonomous vehicle includes the warning indicator.

28 Claims, 8 Drawing Sheets

WARNING INDICATOR SYSTEM AND RELATED METHODS

CROSS REFERENCE TO RELATED APPLICATIONS

The present application is related to co-pending U.S. application Ser. No. 17/869,712, filed Jul. 20, 2022, the entire contents of which are hereby incorporated by reference in its entirety.

TECHNICAL FIELD

The present disclosure relates to warning lights for a sensor pod.

BACKGROUND

Vehicles include side mirrors connected to the vehicle. Some side mirrors may be equipped to gather data and information, communicate with the vehicle, and may assist in navigating the vehicle.

BRIEF SUMMARY

According to an embodiment of the present disclosure, a warning indicator system for an autonomous vehicle includes a sensor pod having a sensor and a sensor pod housing, a connecting assembly configured to couple the sensor pod to the autonomous vehicle, and a warning indicator associated with the sensor pod and the connecting assembly, the warning indicator configured to alert other vehicles and persons to a stopped condition of the autonomous vehicle.

According to an embodiment of the present disclosure, an autonomous vehicle includes a sensor pod having a sensor and a sensor pod housing, a connecting assembly configured to couple the sensor pod to the autonomous vehicle, and a warning indicator associated with the sensor pod and the connecting assembly, the warning indicator configured to alert other vehicles and persons to a stopped condition of the autonomous vehicle.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1:
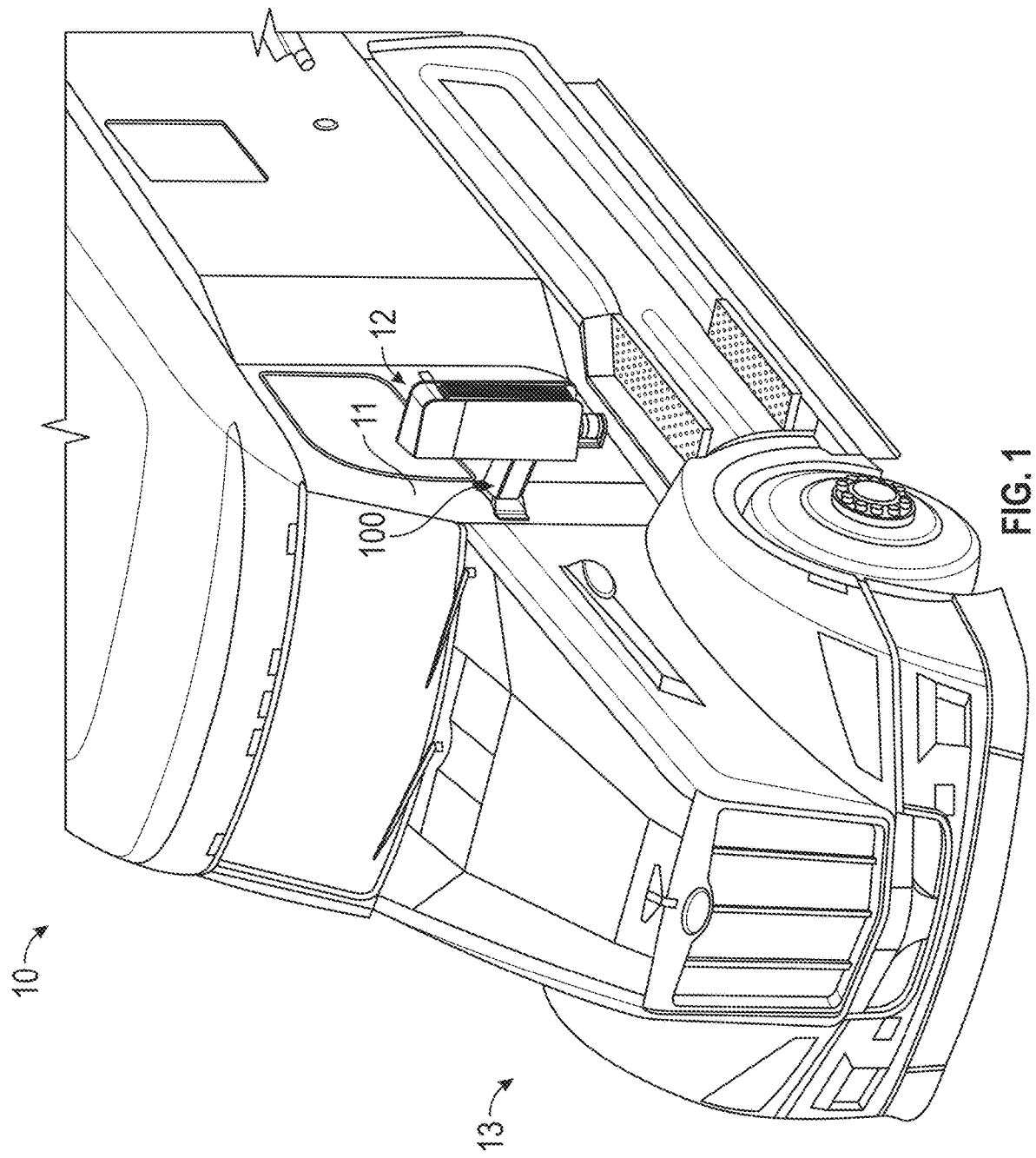
FIG. 1 illustrates a perspective view of a vehicle, according to an embodiment of the present disclosure.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first," "second," and "third" may be used interchangeably to distinguish one component from another and are not intended to signify location or importance of the individual components.

The terms "forward" and "rearward" refer to relative positions of a vehicle. For example, forward refers to a position closer to front hood, front bumper, or front fender of the vehicle and rearward refers to a position closer to a rear bumper, rear trunk, or trailer of the vehicle.

The terms "upper," "lower," "left," and "right" refer to relative positions of a sensor pod with respect to a ground surface, as viewed from a position forward of the sensor pod. For example, "upper" refers to a position vertically above a "lower" position. For example, "left" refers to a position laterally to the left of a "right" position.

The term "side" as used herein may refer to a surface, wall, edge, border, boundary, etc., or simply to a general position or location with respect to the described component (e.g., not referring to any physical component).

The terms "coupled," "fixed," "attached," "connected," and the like, refer to both direct coupling, fixing, attaching, or connecting as well as indirect coupling, fixing, attaching, or connecting through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a one, two, four, ten, fifteen, or twenty percent margin in either individual values, range(s) of values and/or endpoints defining range(s) of values.

Vehicles include sensor pods connected to the vehicle. The sensor pods gather data and information, communicate with the vehicle, and may assist in navigating the vehicle. The sensor pods include a variety of sensors, cameras, and mirrors to gather the data and information, communicate with the vehicle, and where applicable, assist in navigating the vehicle. In the case of commercial vehicles, such as for example, semitrucks, when the vehicle is stopped in a lane of traffic or in a shoulder adjacent to a lane of traffic, warning indicators must be provided to alert approaching traffic of the stopped vehicle. Typically, these warning indicators are provided as warning triangles/cones extending on the ground surface behind (e.g., rear of the rear end of the vehicle) the vehicle. In autonomous commercial vehicles, providing warning indicators behind the vehicle is difficult and complex since there is no operator on the vehicle. A mechanism or system must be built into the cab and/or trailer to deploy the warning triangles/cones without the assistance of an operator and autonomous and/or semi autonomously based on a sensed condition of the vehicle.

Accordingly, there remains a need for improved assemblies, systems, and methods for alerting approaching traffic (in same direction or parallel direction of travel of the vehicle, in a direction of travel opposite to the direction of travel of the vehicle, and/or in a direction of travel perpendicular to or at a nonzero angle to the vehicle) as to stopped condition of the vehicle. In particular, there remains a need for such improved assemblies, systems, and methods in autonomous vehicles, semi-autonomous vehicles, and/or similar vehicles having no local operator aboard the vehicle. Therefore, as described herein, the sensor pod which is provided with the vehicle to enable autonomous or semi-autonomous operation, may include warning indicators thereon to alert approaching traffic and/or approaching persons. Such warning indicators may be lights, such as, for example, light emitting diodes (LEDs), which provide indication of the status of the vehicle. Such warning lights may be in lieu of, or in addition to, other warning indicators aboard the vehicle (e.g., the aforementioned warning triangles/cones). A need also exists for a method for activating the warning lights without an onsite/local operator and/or in an autonomous or semi-autonomous process.

Figure 2:
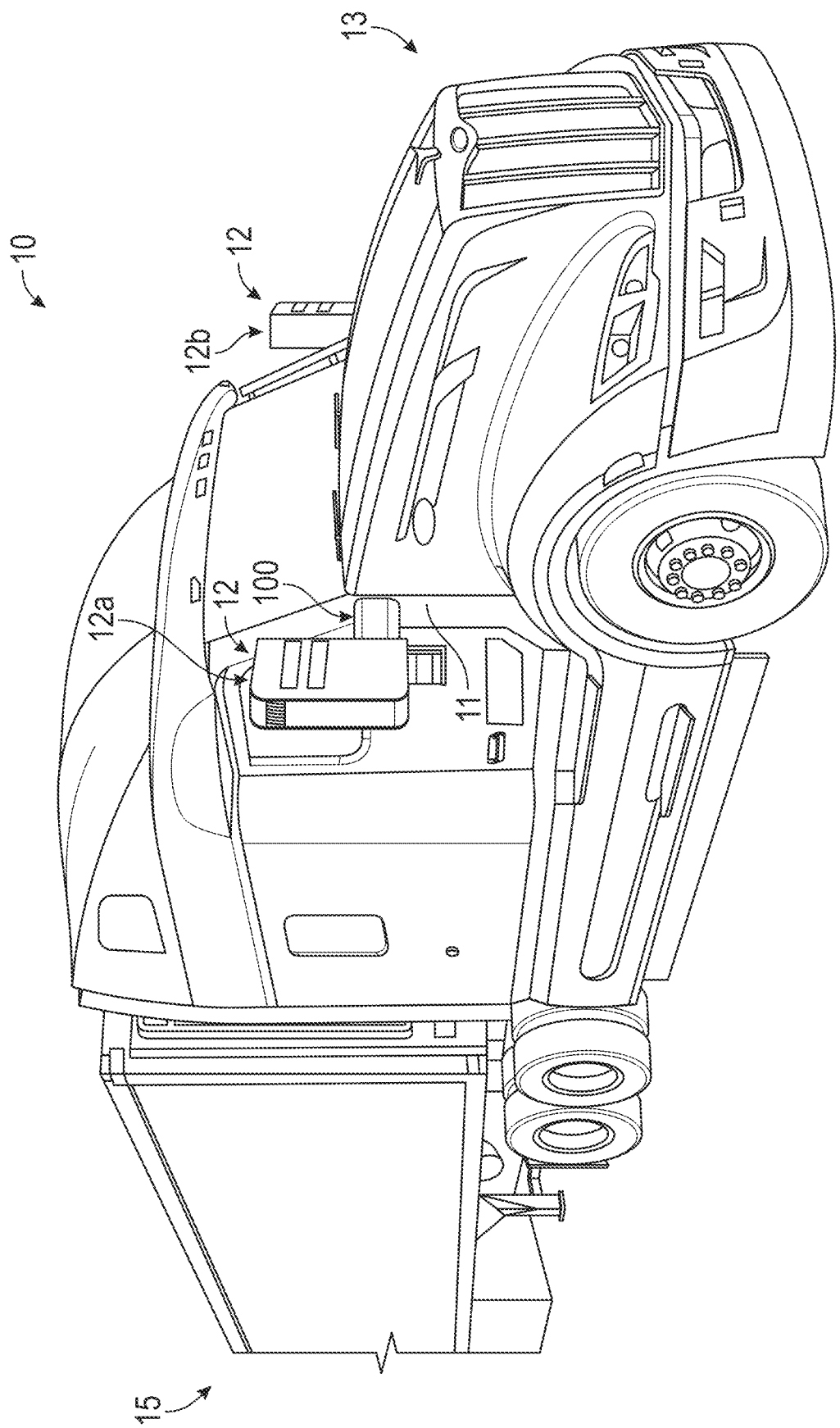
FIG. 2 illustrates a perspective view of a vehicle, according to an embodiment of the present disclosure.

FIGS. 1 and 2 illustrate a vehicle 10 having a sensor pod 12. Although a single sensor pod 12 is illustrated in FIG. 1 and two sensor pods 12 are illustrated in FIG. 2 (e.g., passenger side sensor pod 12a and driver side sensor pod 12b), more or fewer may be provided. The vehicle 10 may be any motor vehicle, such as, for example, but not limited to a car, a truck, a commercial truck, a bus, a watercraft (e.g., boat, ship, underwater vehicles, etc.), a motorcycle, an aircraft (e.g., airplane, helicopter, etc.), or a spacecraft. For ease of description, the vehicle 10 may be referred to herein as a truck 10. The vehicle may have a forward side 13, also referred to as a forward end or a front end, and a rear side 15, also referred to as a rear end, rearward end, or rearward side.

With continued reference to FIGS. 1 and 2, the sensor pod 12 may be a side mirror assembly mounted to the vehicle 10. The sensor pod 12 may assist in navigation of the vehicle 10. In some examples, the sensor pod 12 may assist in navigation in a manner that results in the vehicle 10 being autonomous, self-driving, semi-autonomous, non-autonomous with assisted navigation, etc., or combinations thereof. In this regard, the sensor pod 12 may include components, such as, but not limited to, sensors and mirrors, that may be useful for the operation of the vehicle, or any combination thereof. The vehicle 10 may use (via a processor or controller) data collected by the sensor pod 12 to navigate or to assist in navigating the vehicle 10 and to control the speed, direction, braking, and other functions of the vehicle 10. By way of example, the sensor pod 12 may be, or may include the sensors, cameras, mirrors, and associated components of, the sensor pod described in U.S. Patent Application Publication No. 2022/0144185, the contents of which are herein incorporated by reference in their entirety. Although illustrated as mounted to the A-pillar 11 of the frame of the vehicle 10 near the driver side and passenger side doors, the sensor pod 12 may be mounted to other locations on the vehicle 10, such as, for example, but not limited to, driver side and/or passenger side doors or other locations on the frame of the vehicle 10. The mounting site of the sensor pod 12 may preferably use existing mounting points for the truck 10, or may mount with appropriate hardware to the truck structure. The sensor pod 12 may be connected or coupled to the vehicle 10 with a connecting assembly 100. The sensor pod 12 and/or the connecting assembly 100 may be the same as the sensor pod and connecting assembly described in U.S. application Ser. No. 17/826,000, the contents of which are herein incorporated by reference in their entirety.

As will be described in more detail to follow, and as described in U.S. Patent Application Publication No. 2022/0144185, the sensor pod 12 includes a variety of sensors to monitor the surroundings of the vehicle 10. The sensors may include, for example, but not limited to, one or more cameras, one or more lidars, one or more radars, and one or more inertial measurement units (IMUs). The combined data from the sensors may be used by a processor to autonomously (or semi-autonomously) navigate or to assist a driver in navigating the roadway in a variety of light conditions, weather conditions, traffic conditions, load conditions, road conditions, etc. The sensors, mirrors, and other features of the sensor pod 12 are configured and oriented to provide a predetermined field of view and to provide reliable, accurate, and high quality data for autonomous and semi-autonomous driving. The specific sensor placement and the rigidity of the connecting assembly and support structure enable a sufficient field of view while reducing vibrational disturbances and allowing a high object detection rate and high quality positional data. The sensors and other features associated with the sensors are omitted from FIGS. 3A to 6 solely for clarity, but may be present, as described previously and as described in the aforementioned co-pending applications.

Figure 3A:
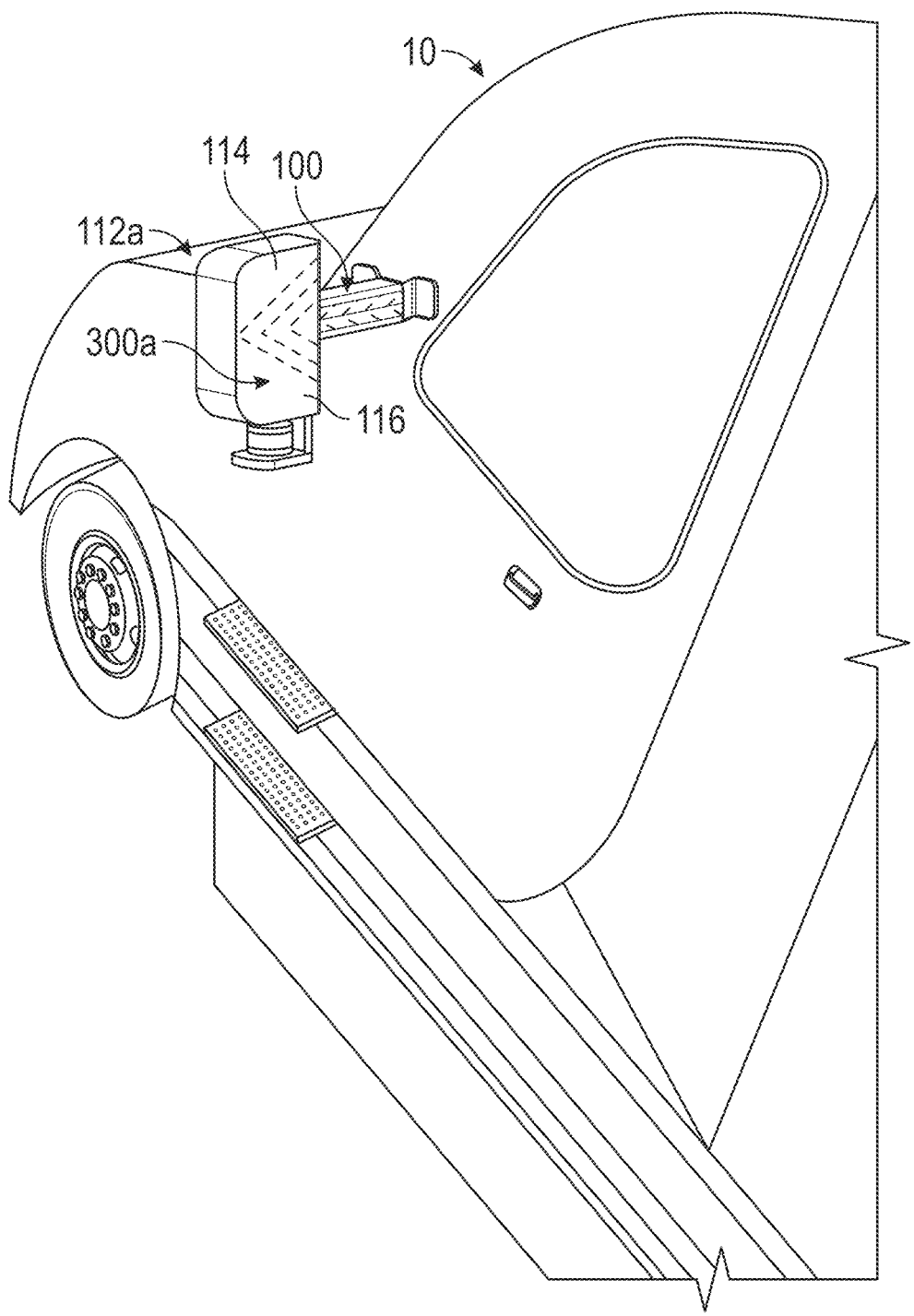
FIG. 3A illustrates a perspective view of a sensor pod, according to an embodiment of the present disclosure.

FIG. 3A shows a perspective view of the sensor pod 112a and the connecting assembly 100. The sensor pod 112a includes a sensor pod housing 114. The sensor pod 112a may be releasably coupled to the vehicle 10 (FIG. 1) such that the sensor pod 112a may be installed, uninstalled, interchanged and/or replaced on the vehicle 10. The sensor pod 112a may be coupled to the vehicle 10 in a manner that allows the sensor pod 112a to be rotated or pivoted with respect to the vehicle 10, such as described in in U.S. application Ser. No. 17/826,000. The sensor pod housing 114 may house at least a portion of the sensors, cameras, mirrors, additional components, etc. required for operation of the sensor pod 112a.

Figure 3B:
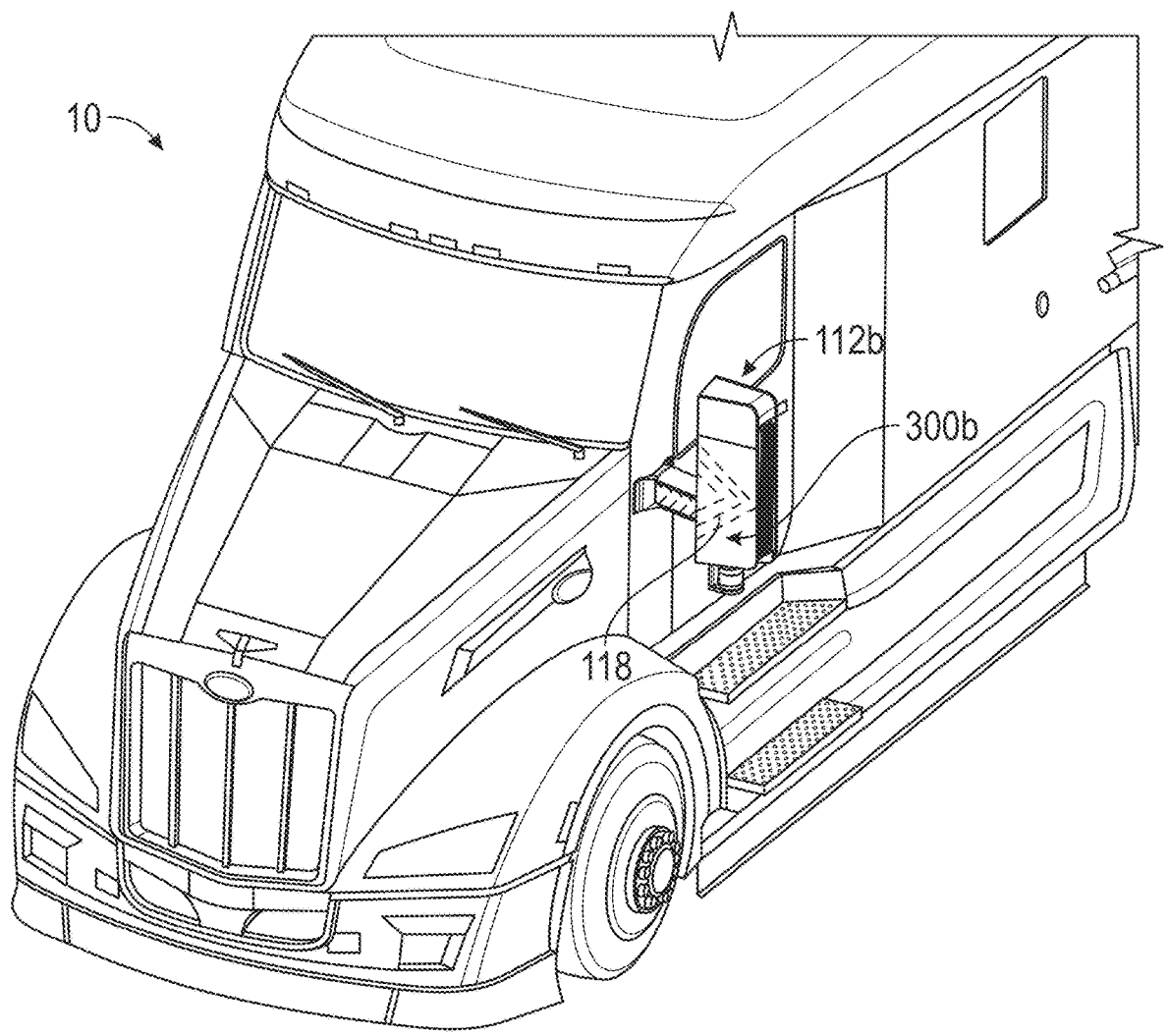
FIG. 3B illustrates a perspective view of another sensor pod, according to an embodiment of the present disclosure.

FIG. 3A shows a warning indicator 300a on a rear facing side 116 of the sensor pod housing 112a. FIG. 3B shows an alternative sensor pod 112b having warning indicator 300b on a forward facing side 118 of the sensor pod 112b. The sensor pod 112a and the second pod 112b may be combined such that the warning indicator is present on both the forward facing side 118 and the rear facing side 116.

Alternatively, the sensor pod 112*a* and the second pod 112*b* may be separate such that the warning indicator is only present on one side of the sensor pod. Alternatively, or additionally, a warning indicator may be presented on an upper side, lower side, lateral side, or any side visible to approaching traffic and/or approaching persons. The warning indicator 300*a* and the warning indicator 300*b* are not limited to the configurations shown in FIG. 3A and FIG. 3B and may be any of the configurations described herein.

FIGS. 4A to 4F represent an exemplary warning indicator 400. The warning indicator 400 may be used as the warning indicator 300*a* and/or the warning indicator 300*b*. The warning indicator 400 may be formed of a series of lights or LEDs built into the sensor pod 212 and the connecting assembly 100. The lights or LEDs may be formed within the housing of the sensor pod 212 and connecting assembly 100 and/or may be coupled to an outer surface of the sensor pod 212 and connecting assembly 100. The lights or LEDs may be formed, coupled, or connected to the sensor pod 212 and connecting assembly 100 in any manner that allows for visibility by an external person or vehicle.

As shown in FIGS. 4A to 4F, the warning indicator 400 may be have a progressively lighting pattern that continuously repeats when the warning indicator 400 is activated. For example, the lights or LEDs may begin with a first configuration 400*a* of FIG. 4A and progress, sequentially, to a last configuration 400*f* of FIG. 4F. In the first configuration 400*a*, the lights or LEDs may take the form of a single arrow 402. As the warning indicator 400 progresses to the last configuration 400*f*, additional arrows 404 may be added. The arrow 402 may be at a location nearest to the vehicle and the last arrow 404 of FIG. 4F may be at a location farthest from the vehicle. The arrows on the connecting assembly 100 may be a constant size, limited by the dimensions of the connecting assembly 100. As the warning indicator 400 progresses to the sensor pod 212, the arrows may increase in size, thus increasing the visibility of the warning indicator 400.

Figure 4A:
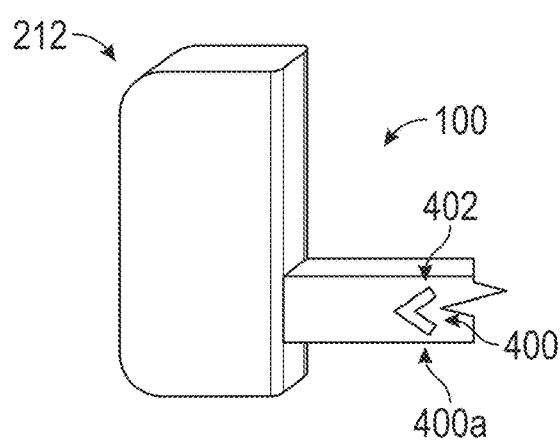
FIG. 4A illustrates a schematic view of exemplary warning lights on a sensor pod, according to an embodiment of the present disclosure.
Figure 4B:
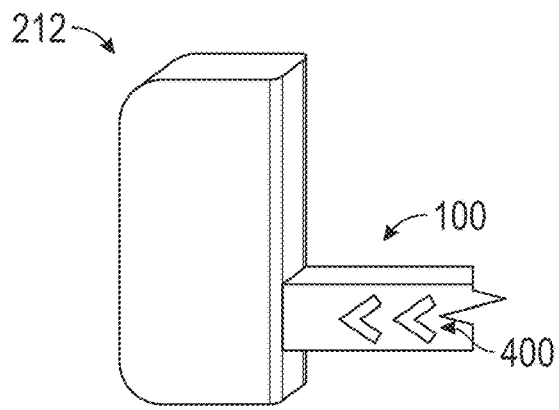
FIG. 4B illustrates a schematic view of exemplary warning lights on a sensor pod, according to an embodiment of the present disclosure.
Figure 4C:
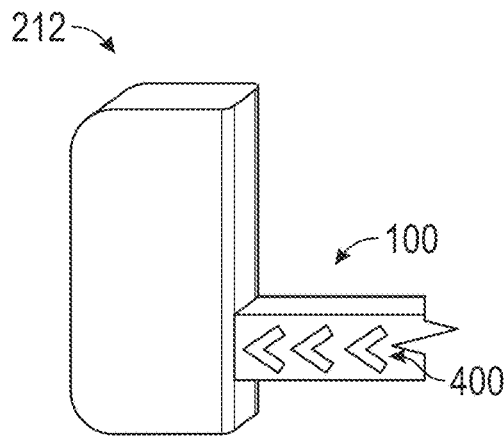
FIG. 4C illustrates a schematic view of exemplary warning lights on a sensor pod, according to an embodiment of the present disclosure.
Figure 4D:
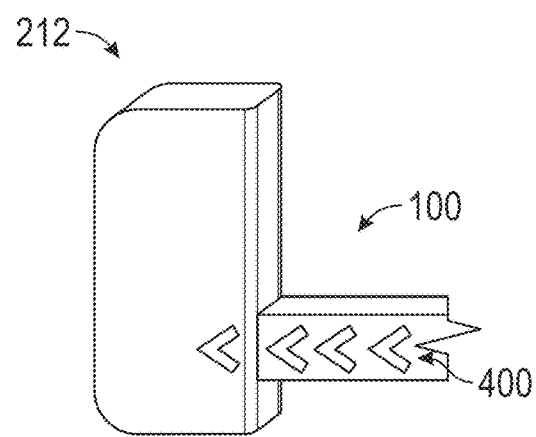
FIG. 4D illustrates a schematic view of exemplary warning lights on a sensor pod, according to an embodiment of the present disclosure.
Figure 4E:
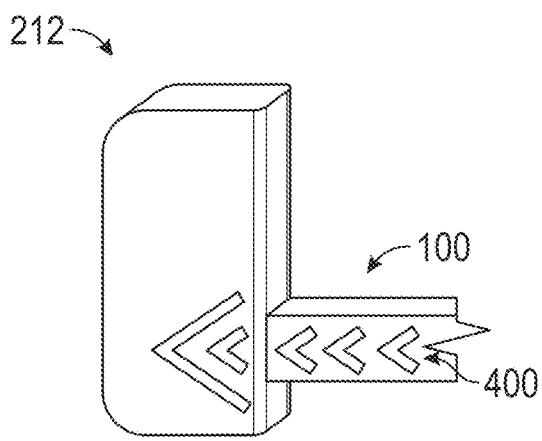
FIG. 4E illustrates a schematic view of exemplary warning lights on a sensor pod, according to an embodiment of the present disclosure.
Figure 4F:
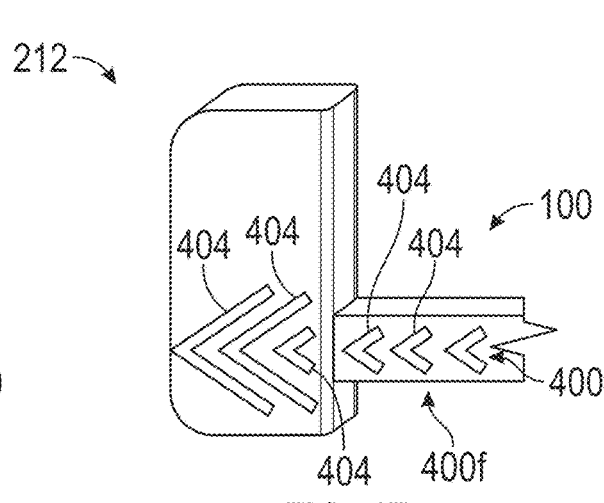
FIG. 4F illustrates a schematic view of exemplary warning lights on a sensor pod, according to an embodiment of the present disclosure.

As mentioned, the lights of the warning indicator 400 may progressively light up from the configuration of FIG. 4A to the configuration of FIG. 4F. Once the configuration of FIG. 4F is achieved, the lights revert back to the configuration of FIG. 4A and the progression may continue again. In this manner, the lighted arrows created by the lights or LEDs may continually and progressively light up during the duration of the activation of the warning indicator 400.

Although described as progressive, the warning indicator 400 may be constant (e.g., the configuration 400*f* is constantly and continuously illuminated for the duration of the activation of the warning indicator 400), the warning indicator 400 may be flashing on and off (e.g., the lights flash between all off and all on in the configuration 400*f*), may be flashing between colors (e.g., the lights flash between one color in the configuration 400*f* and a second, different color in the configuration 400*f*). The colors in any configuration or lighting effect may be the same or different and may be in any pattern. The lighting effect may be any lighting effect, including, but not limited to, the aforementioned progressive, flashing, and constant lighting effects.

If the sensor pod 212 can still actively sense the road environment while the truck is stopped or disabled, the pattern may be adjusted based on the information that the sensor pod receives. As a vehicle approaches the stopped truck, the pattern may flash at a higher frequency, may increase the intensity of the light emitted, may change from one flashing pattern design to another flashing pattern design, or may change colors to create an altered indication pattern to further alert the oncoming vehicle of the stopped truck. Such changes to patterns may be progressive as the approaching vehicle gets nearer and nearer to the stopped truck, or may be changed instantly or near instantly to create a more noticeable change in the pattern. Additionally, multiple changes to the pattern may be implemented as the vehicle approaches. For example, at a first distance, farther away from the truck, the lighting pattern may be a first color pattern at a first rate of progressing flashing of the signal. At a second nearer distance, the pattern may increase in frequency and increase in intensity of the light emitted. At a third even nearer distance, the intensity and frequency could still be increasing, but the pattern may change from a progressive pattern to an all on/all off flashing pattern and change color. Any combination of changing the signal as a function of the distance to an approaching car may be implemented to increase the opportunity of the approaching vehicle to visibly observe the stopped truck.

Figure 5:
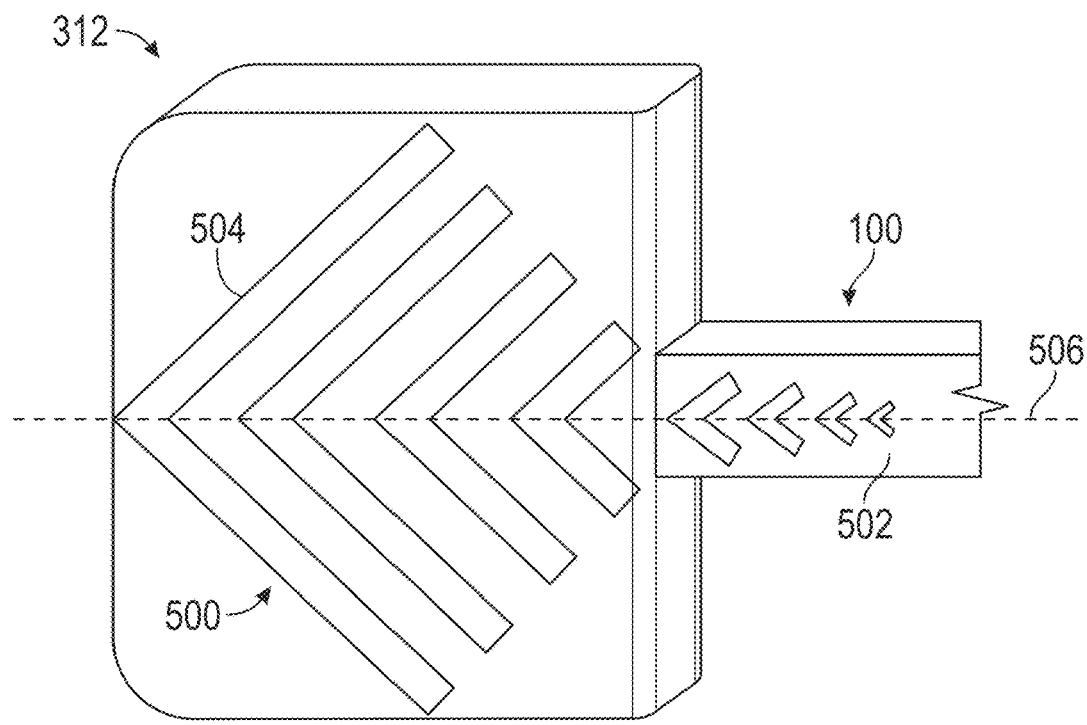
FIG. 5 illustrates another sensor pod with warning lights, accordingly to an embodiment of the present disclosure.

FIG. 5 illustrates another exemplary warning indicator 500 for use on a sensor pod 312 and connecting assembly 100. The warning indicator 500 may be used as the warning indicator 300*a* and/or the warning indicator 300*b*. The warning indicator 500 may be formed of a series of lights or LEDs built into the sensor pod 312 and the connecting assembly 100. The lights or LEDs may be formed within the housing of the sensor pod 312 and connecting assembly 100 and/or may be coupled to an outer surface of the sensor pod 312 and connecting assembly 100. The lights or LEDs may be formed, coupled, or connected to the sensor pod 312 and connecting assembly 100 in any manner that allows for visibility by an external person or vehicle.

The connecting assembly 100 coupling the sensor pod 312 to the vehicle 10 (FIG. 1) may be arranged to intersect the sensor pod 312 in the middle of the side of the sensor pod 312. With this arrangement, the lights or LEDs of the warning indicator 500 may start relatively small at a smallest, first arrow 502 and progressively enlarge to a largest, last arrow 504. Arranging the connecting assembly 100 in the middle of the sensor pod 312 may allow for a warning indicator 500 that is centered about an axis 506 and takes advantage of the full space availability on the sensor pod 312.

Figure 6:
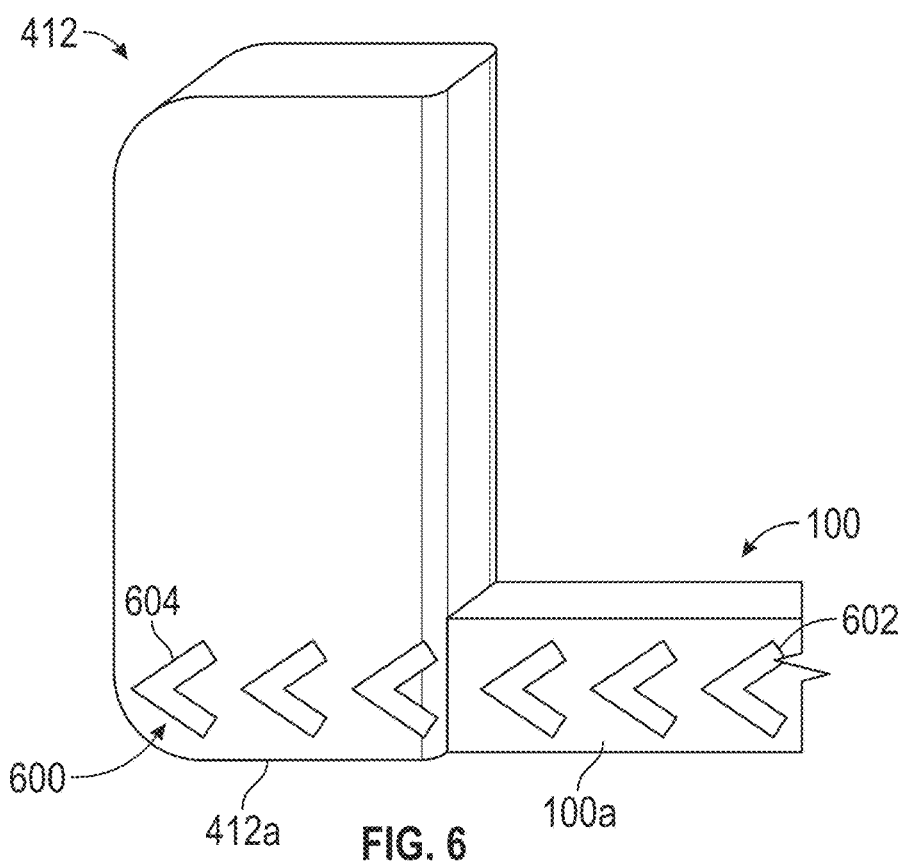
FIG. 6 illustrates another sensor pod with warning lights, accordingly to an embodiment of the present disclosure.

FIG. 6 illustrates another exemplary warning indicator 600 for use on a sensor pod 412 and connecting assembly 100. The warning indicator 600 may be used as the warning indicator 300*a* and/or the warning indicator 300*b*. The warning indicator 600 may be formed of a series of lights or LEDs built into the sensor pod 412 and the connecting assembly 100. The lights or LEDs may be formed within the housing of the sensor pod 412 and connecting assembly 100 and/or may be coupled to an outer surface of the sensor pod 412 and connecting assembly 100. The lights or LEDs may be formed, coupled, or connected to the sensor pod 412 and connecting assembly 100 in any manner that allows for visibility by an external person or vehicle.

The connecting assembly 100 coupling the sensor pod 412 to the vehicle 10 (FIG. 1) may be arranged to intersect the sensor pod 412 at a lower end such that a bottom surface 100*a* of the connecting assembly 100 is flush and coplanar or nearly flush and coplanar with a bottom surface 412*a* of the sensor pod 412. With this arrangement, the lights or LEDs of the warning indicator 600 may be arranged to be of a constant size from a first arrow 602 to a last arrow 604.

Any of the lighting effects described with respect to FIGS. 4A to 4F may be applied to the warning indicator 500 and/or the warning indicator 600. Any color or color pattern may be applied to the warning indicator 500 and/or the warning indicator 600. For example, any of the warning indicators described herein may be flashing, constant, progressively lighted, etc. In some examples, the flashing may be such that all of the lights or LEDs flash at the same time (e.g., flash between on and off and/or flash between two or more colors). In some examples, the flashing may be such that alternating lights or LEDs flash (e.g., every other light is on, while the adjacent ever other light is off). In some examples, the flashing is progressive, such as in the example of FIGS. 4A to 4F, with the lights flashing in a manner extending outward toward the edge of the sensor pod.

Although the foregoing exemplary warning indicators depict an arrow shape, other shapes and configurations are contemplated. Including, for example, one or more triangles (e.g., similar to warning triangles), one or more exclamation points, one or more caret symbols (e.g., FIG. 5), one or more solid or block arrows, etc. In some examples, the warning indicators may be a border of lights around the perimeter of the sensor pod, for example, around the perimeter of rear side 116 and/or around the perimeter of the forward side 118. Thus, the warning indicator may be a lighted outline of the sensor pod and/or a shape of an arrow. Any of the examples disclosed herein may be combined with other examples. For example, the lighted border and the arrows of any FIGS. 3A to 6 may both be provided on the sensor pod and connecting assembly. In this manner, the combination of two lighted patterns may draw additional attention to the warning indicator thus further alerting approaching traffic and/or persons. Additionally, the arrows may be directed to other directions (e.g., upward, downward, angled, etc.) as opposed to, or in addition, the depicted direction away from the vehicle.

In some examples, multiple configurations and multiple patterns may be provided for the warning indicators. For example, a static border of lights and a flashing arrow within the static border of lights.

In some examples, the warning indicators may be a light pattern. In some examples, the warning indicators may be lights, LEDs, an LED panel or screen (e.g., similar to a tablet or computer screen). The warning indicators may be visual indicators not limited to the examples described herein. Additionally, audio indicators may be provided in conjunction with the visual warning indicators to provide additional warning to approaching traffic as to the status of the autonomous vehicle.

Accordingly, as described herein, the warning indicators may be present on both the sensor pod and the connecting assembly. The warning indicators may be present in a manner that alerts approaching persons and/or approaching traffic as to the status of the autonomous vehicle (e.g., that the autonomous vehicle is stopped). The warning indicators may be a light pattern that extends along the arm of the connecting assembly and along the sensor pod.

In some examples, the warning indicators may change configuration when approaching traffic and/or persons are within a predetermined distance from the autonomous vehicle. For example, a predetermined minimum separation distance may be set such that when a vehicle or person is too close to the autonomous vehicle (e.g., the predetermined distance is crossed) the lights or LEDs flash at a higher frequency and/or at a higher intensity or brightness, thus increasing the awareness to the approaching person and/or traffic.

The warning indicators of the present disclosure may be arranged such that they take up a maximum amount of available space on the exterior surface of one or more surfaces of the sensor pod and/or connecting assembly. For example, the warning indicator may take up more than 50% of the available space on one or more sides of the sensor pod. In some examples, the warning indicator may occupy more than 60%, more than 70%, more than 80%, more than 90%, or all 100% of available space on one or more sides of the sensor pod. The warning indicators may take up as much available space on the sensor pod as required to alert approaching traffic and/or persons, while not interfering with the operation of the sensors, cameras, and other equipment on the sensor pod. In some examples, the forward side and/or the rear side may be fully occupied or at least 50%, 60%, 70%, 80%, or 90% occupied by the warning indicator. In some examples, an LED screen may be provided on the forward side and/or the rear side to occupy at least 50%, 60%, 70%, 80%, or 90%, or up to and including 100% of the sensor pod side.

Therefore, the warning indicators of the present disclosure provide a light pattern on the arm and the sensor pod extending from the side of the vehicle to create an arrow signal directing traffic to the side and/or around the vehicle. Providing the warning indicators on both sides of the vehicle allows for the vehicle to pullover or stop in the center line and alert approaching traffic and/or persons on both sides of the vehicle. In other examples, when the vehicle is pulled to the left shoulder, traffic on the right may be alerted via warning indicators on the right sensor pod. Likewise, when the vehicle is pulled to the right shoulder, traffic on the left may be alerted via warning indicators on the left sensor pod.

The warning indicators of the present disclosure provide the benefit of alerting approaching traffic and persons as to the stopped vehicle without the need for deployed hardware (such as hazard triangles or cones). Accordingly, no additional hardware is required to be attached to the trailer, no moving parts that may wear, become stuck, or fail are included, etc.

As mentioned, the warning indicators of the present disclosure are included with or coupled to the sensor pod and the connecting assembly. The maximum width of the vehicle is set by U.S. law. That is, the maximum width to which the sensor pods may extend is U.S. federally regulated. The sensor pods are coupled to the vehicle in a manner that maximizes the maximum allowable width. For example, the sensor pods may extend from the vehicle as far as permissible to stay within the maximum allowable width to give the sensor pods the greatest allowable outward projection from the vehicle. Due to this arrangement of the sensor pods, the warning indicators also extend as far from the vehicle as permissible to stay within the maximum allowable width. Such a maximization of the extension of the sensor pods, and in turn, the warning indicators, allows for the greatest outward projection of the alert to the approaching traffic and approaching persons.

Figure 7:
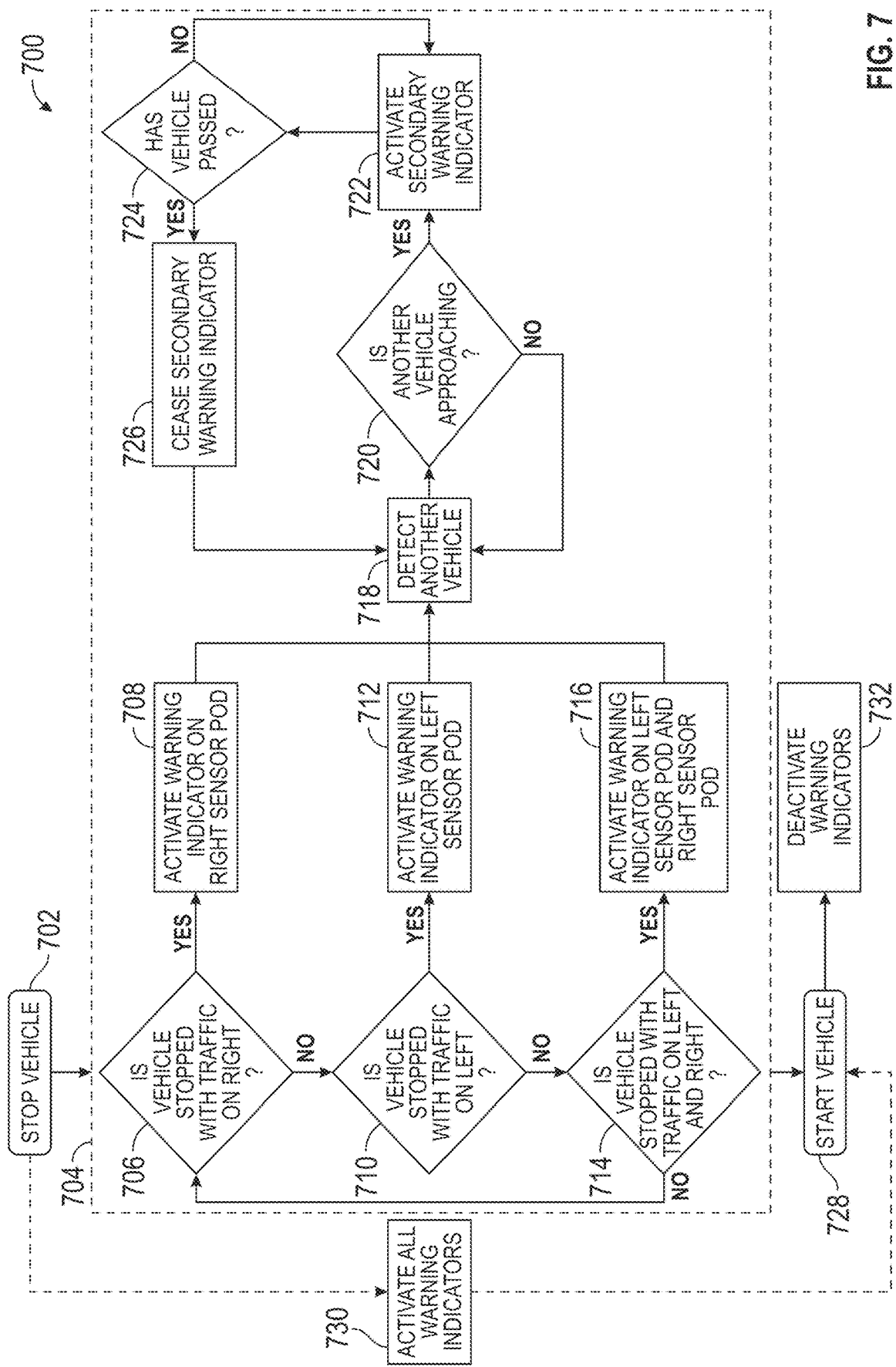
FIG. 7 illustrates a method, according to an embodiment of the present disclosure.

FIG. 7 illustrates a method 700 for activating a warning indicator on a sensor pod, where the warning indicator and/or the sensor pod may be any of the foregoing examples, either alone or in combination. The method 700 may be autonomous or semi-autonomous. That is, upon stopping of the vehicle, step 702, the method 700 may begin autonomously by the vehicle itself upon sensing that the vehicle is stopped and/or the method 700 may be actuated by a remote operator upon the vehicle sensing the vehicle is stopped and alerting the remote operator.

Once the vehicle is determined to be stopped, step 704 activates the warning indicators according to a predetermined algorithm or program. Within step 704, the vehicle determines where the vehicle is stopped in relation to approaching traffic (where approaching traffic is in same direction or parallel direction of travel of the vehicle, in a direction of travel opposite to the direction of travel of the vehicle, and/or in a direction of travel perpendicular to or at a nonzero angle to the vehicle). Based on the location of the vehicle with respect to approaching traffic, one or more warning indicators are activated. For example, at step 706, if the vehicle is stopped with traffic on the right (in either or both directions of travel), then the warning indicator on the same side (e.g., the right side in relation to the traffic) is activated at step 708. At step 710, for example, if the vehicle is stopped with traffic on the left (in either or both directions of travel), then the warning indicator on the same side (e.g., the left side in relation to the traffic) is activated at step 712. At step 714, for example, if the vehicle is stopped with traffic on both sides (in either or both directions of travel), then the warning indicators on both sides of the vehicle may be activated at step 716.

The aforementioned step 704 may be a logic process with the vehicle computer progressively stepping through each of steps 706, 710, and 714 in a yes/no format, if the answer is no to all of the steps, the vehicle computer may repeat the step 704 for the duration of the stopped time until a vehicle is detected. Alternatively, the step 704 may occur simultaneously. Alternatively, the step 704 may be omitted such that any time the vehicle is stopped, one or more or all of the warning indicators are activated for the duration of the stoppage, such as shown at step 730.

Accordingly, determining the side to warn based on the side of traffic, such as described above, allows for traffic on the side of the activated warning indicator to be alerted to the stopped vehicle. In some examples, the method may simply activate all warning indicators without regard to which side has approaching traffic.

In some examples, as mentioned previously, the warning indicators may simply be activated continuously for the entire duration of the vehicle stoppage, such as shown at step 730. Once the vehicle is started at step 728, the warning indicators may be deactivated at step 732.

In other examples, the method may include steps 718 to 726 to activate the warning indicators at a sign of approaching traffic. For example, at step 718 the computer may detect approaching vehicles. At step 720, the system may determine if another vehicle is approaching. If not, the system may continue to inquire until a vehicle approaches. If yes, then a secondary warning indicator may be activated at step 722. This may simply be reactivation of a previously on warning indicator, or may be continuous activation of a warning indicator, or may be a new configuration of a warning indicator. At step 724, the system determines if the vehicle is still present or if the vehicle has passed. If yes, the warning indicator is maintained in the activated condition. If no, then the step ceases activation at step 726 and continues to monitor for approaching traffic at step 718.

The detect approaching vehicle step 718 may also include determining the distance to the approaching vehicle. Based upon the distance to the approaching vehicle, the characteristics of the secondary warning system may be changed to create different signal patterns to alert the oncoming vehicle (as previously described above). As the vehicle approaches closer to the stopped vehicle, additional, more aggressive warning patterns may be initiated. Once approaching vehicles have passed, the initial warning indicator pattern can be resumed. In such an embodiment, the warning indicator may have a first state and a second state where the change in warning pattern from the first state to the second state is controlled by the distance between the stopped truck and the approaching vehicle. The change from one state to the next may be progressive, or may change condition from the first state to the second state based upon a threshold distance. Additionally, more than two states of the warning indicator may be implemented, so that intermediate distance warning indicators may be initiated.

The aforementioned methods may be autonomous or semi-autonomous. The methods may be activated by the vehicle computer, which may be a computer as described in FIG. 8. In some examples, the sensors of the sensor pod may provide information to the vehicle computer to assist in the method 700 of FIG. 7.

Figure 8:
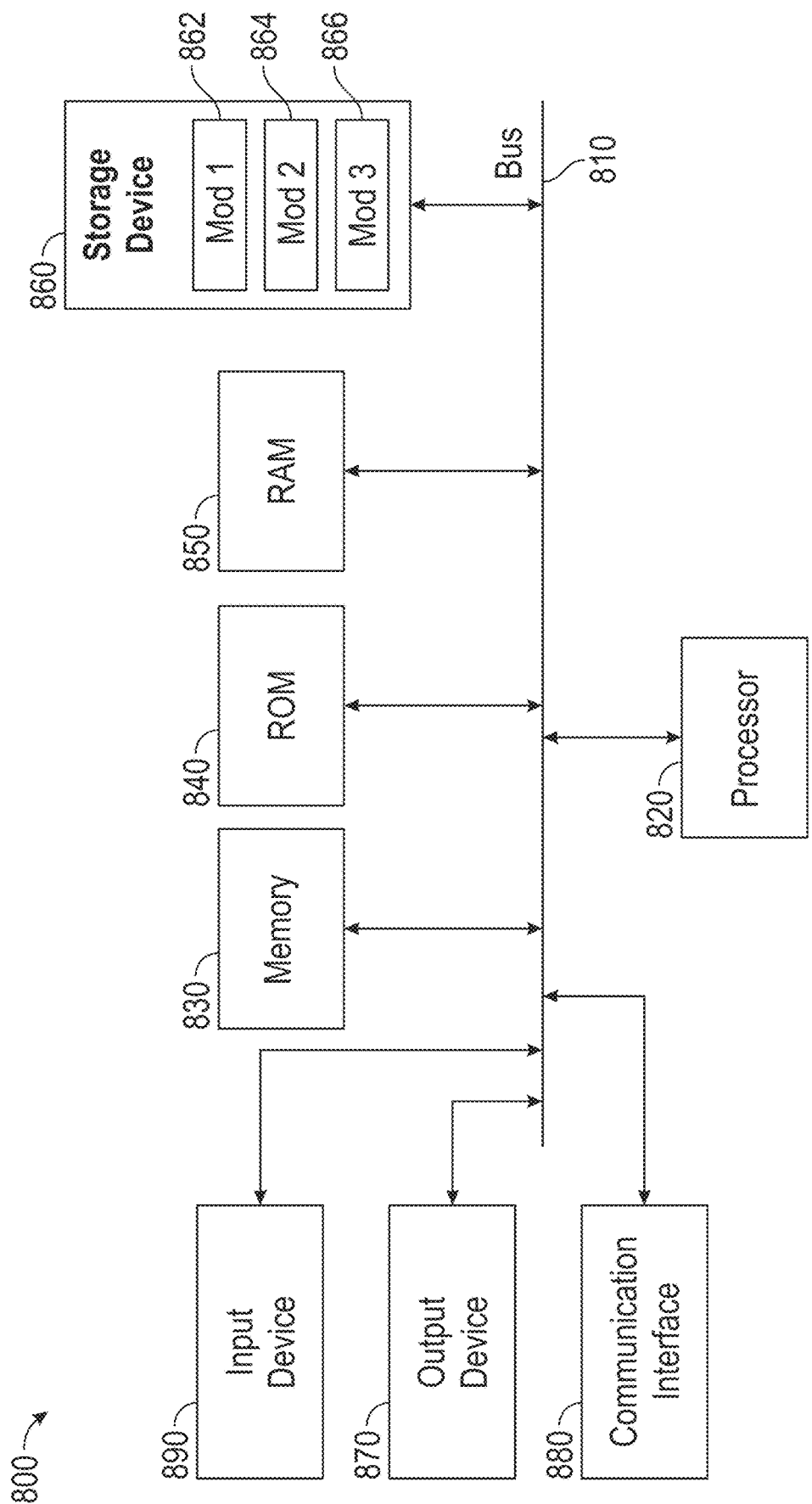
FIG. 8 illustrates a computer system, according to an embodiment of the present disclosure.

With reference to FIG. 8, an exemplary system includes a general-purpose computing device 800, including a processing unit (CPU or processor) 820 and a system bus 810 that couples various system components including the system memory 830 such as read-only memory (ROM) 840 and random access memory (RAM) 850 to the processor 820. The computing device 800 can include a cache of high-speed memory connected directly with, in close proximity to, or integrated as part of the processor 820. The computing device 800 copies data from the memory 830 and/or the storage device 860 to the cache for quick access by the processor 820. In this way, the cache provides a performance boost that avoids processor 820 delays while waiting for data. These and other modules can control or be configured to control the processor 820 to perform various actions. Other system memory 830 may be available for use as well. The memory 830 can include multiple different types of memory with different performance characteristics. It can be appreciated that the disclosure may operate on a computing device 800 with more than one processor 820 or on a group or cluster of computing devices networked together to provide greater processing capability. The processor 820 can include any general-purpose processor and a hardware module or software module, such as module 1 862, module 2 864, and module 3 866 stored in storage device 860, configured to control the processor 820 as well as a special-purpose processor where software instructions are incorporated into the actual processor design. The processor 820 may essentially be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output (BIOS) stored in ROM 840 or the like, may provide the basic routine that helps to transfer information between elements within the computing device 800, such as during start-up. The computing device 800 further includes storage devices 860 such as a hard disk drive, a magnetic disk drive, an optical disk drive, tape drive or the like. The storage device 860 can include software modules 862, 864, 866 for controlling the processor 820. Other hardware or software modules are contemplated. The storage device 860 is connected to the system bus 810 by a drive interface. The drives and the associated computer-readable storage media provide nonvolatile storage of computer-readable instructions, data structures, program modules and other data for the computing device 800. In one aspect, a hardware module that performs a particular function includes the software component stored in a tangible computer-readable storage medium in connection with the necessary hardware components, such as the processor 820, system bus 810, output device 870, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the device 800 is a small, handheld computing device, a desktop computer, or a computer server.

Although the exemplary embodiment described herein employs the hard disk 860, other types of computer-readable media which can store data that are accessible by a computer, such as magnetic cassettes, flash memory cards, digital versatile disks, cartridges, random access memories (RAMs) 850, and read-only memory (ROM) 840, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art, such as, for example, a display. In some instances, multimodal systems enable a user to provide multiple types of input to communicate with the computing device 800. The communications interface 880 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Further aspects of the present disclosure are provided by the subject matter of the following clauses.

According to an aspect of the disclosure, a warning indicator system for an autonomous vehicle, the warning indicator system includes a sensor pod having a sensor and a sensor pod housing, a connecting assembly configured to couple the sensor pod to the autonomous vehicle, and a warning indicator associated with the sensor pod and the connecting assembly, the warning indicator configured to alert other vehicles and persons to a stopped condition of the autonomous vehicle.

The warning indicator system of the preceding clause, wherein the warning indicator comprises a plurality of LEDs coupled to the sensor pod housing and the connecting assembly.

The warning indicator system of any preceding clause, wherein the warning indicator comprises an LED screen coupled to the sensor pod housing and the connecting assembly.

The warning indicator system of any preceding clause, wherein the warning indicator comprises a plurality of LEDs or an LED screen formed within the sensor pod housing and the connecting assembly.

The warning indicator system of any preceding clause, wherein the warning indicator comprises one or more caret arrows oriented in a direction facing outward from the autonomous vehicle.

The warning indicator system of any preceding clause, wherein the one or more caret arrows are configured to progressively flash, to flash between on and off, to flash between different colors, to be constantly on, or any combination thereof.

The warning indicator system of any preceding clause, wherein the one or more caret arrows are configured to have a predetermined color pattern and a predetermined light effect, and wherein the predetermined color pattern and the predetermined light effect are based on a combination of the stopped condition of the autonomous vehicle and the other vehicles and persons.

The warning indicator system of any preceding clause, wherein the one or more caret arrows comprises a plurality of caret arrows that are constant in size along the connecting assembly and increase in a size along a width of the sensor pod housing.

The warning indicator system of any preceding clause, wherein the one or more caret arrows comprises a plurality of caret arrows that are constant in size along the connecting assembly and along the sensor pod housing.

The warning indicator system of any preceding clause, wherein the one or more caret arrows comprises a plurality of caret arrows that increase in a size along the connecting assembly and along a width of the sensor pod housing, wherein a first caret arrow at a location nearest to the autonomous vehicle is the smallest of all of the plurality of caret arrows and a second caret arrow at a location farthest from the autonomous vehicle is the largest of all of the plurality of caret arrows.

The warning indicator system of any preceding clause, wherein the one or more caret arrows comprises a plurality of caret arrows that progressively flash from a location nearest to the autonomous vehicle to a location farthest from the autonomous vehicle.

The warning indicator system of any preceding clause, wherein the warning indicator is configured to progressively flash, to flash between on and off, to flash between different colors, to be constantly on, or any combination thereof.

The warning indicator system of any preceding clause, wherein the warning indicator is configurated to have a predetermined color pattern and a predetermined light effect, and wherein the predetermined color pattern and the predetermined light effect are based on a combination of the stopped condition of the autonomous vehicle and the other vehicles and persons.

The warning indicator system of any preceding clause, wherein the warning indicator changes at least one of the predetermined color pattern and the predetermined light effect from a first state to a second state based upon the distance between the autonomous vehicle and the other vehicle and persons.

The warning indicator system of any preceding clause, wherein the warning indicator does not include deployed hardware.

The warning indicator system of any preceding clause, wherein the warning indicator is continuously activated for an entirety of the stopped condition.

The warning indicator system of any preceding clause, wherein the sensor pod comprises a driver side sensor pod and a passenger side sensor pod, and wherein the warning indicator comprises a driver side warning indicator associated with the driver side sensor pod and a passenger side warning indicator associated with the passenger side sensor pod.

The warning indicator system of any preceding clause, wherein the driver side warning indicator and the passenger side warning indicator are selectively actuated based on the stopped condition of the autonomous vehicle.

The warning indicator system of any preceding clause, wherein the sensor comprises one or more of one or more lidars, one or more radars, and one or more cameras, and wherein the warning indicator is configured to be activated based on data received from the sensor.

The warning indicator system of any preceding clause, wherein the sensor detects the stopped condition of the autonomous vehicle.

According to an aspect of the present disclosure, an autonomous vehicle includes a sensor pod having a sensor and a sensor pod housing, a connecting assembly configured to couple the sensor pod to the autonomous vehicle, and a warning indicator associated with the sensor pod and the connecting assembly, the warning indicator configured to alert other vehicles and persons to a stopped condition of the autonomous vehicle.

The autonomous vehicle of the preceding clause, wherein the warning indicator comprises a plurality of LEDs or an LED screen coupled to or formed within the sensor pod housing and the connecting assembly.

The autonomous vehicle of any preceding clause, wherein the warning indicator comprises one or more caret arrows oriented in a direction facing outward from the autonomous vehicle.

The autonomous vehicle of any preceding clause, wherein the warning indicator is configured to progressively flash, to flash between on and off, to flash between different colors, to be constantly on, or any combination thereof.

The autonomous vehicle of any preceding clause, wherein the warning indicator is configured to have a predetermined color pattern and a predetermined light effect, and wherein the predetermined color pattern and the predetermined light effect are based on a combination of the stopped condition of the autonomous vehicle and the other vehicles and persons.

The autonomous vehicle of any preceding clause, wherein the warning indicator changes at least one of the predetermined color pattern and the predetermined light effect from a first state to a second state based upon the distance between the autonomous vehicle and the other vehicle and persons.

The autonomous vehicle of any preceding clause, wherein the warning indicator extends to a maximum allowable width of the autonomous vehicle.

The autonomous vehicle of any preceding clause, wherein the warning indicator is continuously activated for an entirety of the stopped condition.

The autonomous vehicle of any preceding clause, wherein the sensor pod comprises a driver side sensor pod and a passenger side sensor pod, and wherein the warning indicator comprises a driver side warning indicator associated with the driver side sensor pod and a passenger side warning indicator associated with the passenger side sensor pod.

The autonomous vehicle of any preceding clause, wherein the driver side warning indicator and the passenger side warning indicator are selectively actuated based on the stopped condition of the autonomous vehicle.

The autonomous vehicle of any preceding clause, wherein the sensor comprises one or more of one or more lidars, one or more radars, and one or more cameras, and wherein the warning indicator is configured to be activated based on data received from the sensor.

The autonomous vehicle of any preceding clause, wherein the sensor detects the stopped condition of the autonomous vehicle.

According to an aspect of the present disclosure, a method for warning approaching vehicles of an autonomous vehicle includes sensing a stopped condition of the autonomous vehicle, activating a warning indicator of the autonomous vehicle based on the stopped condition, sensing a start condition of the autonomous vehicle, and deactivating the warning indicator of the autonomous vehicle based on the start condition, wherein the warning indicator comprises a plurality of LEDs or an LED panel coupled to or formed within a sensor pod coupled to the autonomous vehicle.

The method of the preceding clause, wherein sensing a stopped condition of the autonomous vehicle comprises sensing the autonomous vehicle is stopped and is not driving, the sensing providing by one or more sensors associated with the sensor pod.

The method of any preceding clause, wherein the sensor pod comprises a driver side sensor pod and a passenger side sensor pod, and wherein the warning indicator comprises a driver side warning indicator associated with the driver side sensor pod and a passenger side warning indicator associated with the passenger side sensor pod.

The method of any preceding clause, wherein activating the warning indicator comprises simultaneously activating both the driver side warning indicator and the passenger side warning indicator.

The method of any preceding clause, wherein deactivating the warning indicator comprises simultaneously deactivating both the driver side warning indicator and the passenger side warning indicator.

The method of any preceding clause, wherein activating the warning indicator is continuous through an entirety of the stopped condition.

The method of any preceding clause, wherein activating the warning indicator comprises activating a warning indicator on the sensor pod and on a connecting assembly coupling the sensor pod to the autonomous vehicle.

The method of any preceding clause, wherein activating the warning indicator comprises turning on the plurality of LEDs or the LED panel.

The method of any preceding clause, wherein deactivating the warning indicator comprises turning off the plurality of LEDs or the LED panel.

The method of any preceding clause, wherein activating the warning indicator comprises causing the plurality of LEDs or the LED panel to display one or more caret arrows oriented in a direction facing outward from the autonomous vehicle.

The method of any preceding clause, wherein activating the warning indicator comprises causing the one or more caret arrows to progressively flash, to flash between on and off, to flash between different colors, to be constantly on, or any combination thereof.

The method of any preceding clause, wherein activating the warning indicator comprises causing the one or more caret arrows to have a predetermined color pattern and a predetermined light effect, and wherein the predetermined color pattern and the predetermined light effect are based on a combination of the stopped condition of the autonomous vehicle and a sensed condition approaching traffic.

The method of any preceding clause, wherein the one or more caret arrows comprises a plurality of caret arrows that are constant in size along a connecting assembly coupling the sensor pod to the autonomous vehicle and increase in a size along a width of the sensor pod housing.

The method of any preceding clause, wherein the one or more caret arrows comprises a plurality of caret arrows that are constant in size along a connecting assembly coupling the sensor pod to the autonomous vehicle and along the sensor pod housing.

The method of any preceding clause, wherein the one or more caret arrows comprises a plurality of caret arrows that increase in a size along a connecting assembly coupling the sensor pod to the autonomous vehicle and along a width of the sensor pod housing, wherein a first caret arrow at a location nearest to the autonomous vehicle is the smallest of all of the plurality of caret arrows and a second caret arrow at a location farthest from the autonomous vehicle is the largest of all of the plurality of caret arrows.

The method of any preceding clause, wherein activating the warning indicator comprises causing the one or more caret arrows to progressively flash from a location nearest to the autonomous vehicle to a location farthest from the autonomous vehicle.

The method of any preceding clause, wherein activating the warning indicator comprises causing the warning indicator to progressively flash, to flash between on and off, to flash between different colors, to be constantly on, or any combination thereof.

The method of any preceding clause, wherein the warning indicator is configured to have a predetermined color pattern and a predetermined light effect, and wherein the predetermined color pattern and the predetermined light effect are based on a combination of the stopped condition of the autonomous vehicle and the other vehicles and persons.

The method of any preceding clause, further comprising sensing a location of approaching traffic or approaching persons with respect to the stopped autonomous vehicle.

The method of any preceding clause, wherein the warning indicator comprises a plurality of warning indicators, the method further comprising selectively activating one or more of the plurality of warning indicators based on the sensed location of approaching traffic or approaching persons.

The method of any preceding clause, wherein the sensor pod comprises a driver side sensor pod and a passenger side sensor pod, and wherein the warning indicator comprises a driver side warning indicator associated with the driver side sensor pod and a passenger side warning indicator associated with the passenger side sensor pod.

The method of any preceding clause, wherein sensing determines the locating of approaching traffic or approaching persons is on the right, and the passenger side warning indicator is activated.

The method of any preceding clause, wherein sensing determines the locating of approaching traffic or approaching persons is on the left, and the driver side warning indicator is activated.

The method of any preceding clause, wherein sensing determines the locating of approaching traffic or approaching persons is on both the right and the left, and both the passenger side warning indicator and the driver side warning indicator are simultaneously activated.

The method of any preceding clause, wherein the sensing the location of approaching traffic or approaching persons is continuous through an entirety of the stopped condition.

Although the foregoing description is directed to the preferred embodiments, it is noted that other variations and modifications will be apparent to those skilled in the art and may be made without departing from the spirit or scope of the disclosure. Moreover, features described in connection with one embodiment may be used in conjunction with other embodiments, even if not explicitly stated above.

The invention claimed is:

1. A warning indicator system for an autonomous vehicle, the warning indicator system comprising:
  a sensor pod having:
    a sensor; and
    a sensor pod housing;
  a connecting assembly configured to couple the sensor pod to the autonomous vehicle; and
  a warning indicator associated with the sensor pod and the connecting assembly, the warning indicator configured to alert other vehicles and persons to a stopped condition of the autonomous vehicle,
  wherein the warning indicator comprises one or more caret arrows oriented in a direction facing outward from the autonomous vehicle, and
  wherein the one or more caret arrows are configured to have a predetermined color pattern and a predetermined light effect, and wherein the predetermined color pattern and the predetermined light effect are based on a combination of the stopped condition of the autonomous vehicle and the other vehicles and persons.

2. The warning indicator system of claim 1, wherein the warning indicator comprises a plurality of LEDs coupled to the sensor pod housing and the connecting assembly.

3. The warning indicator system of claim 1, wherein the warning indicator comprises an LED screen coupled to the sensor pod housing and the connecting assembly.

4. The warning indicator system of claim 1, wherein the warning indicator comprises a plurality of LEDs or an LED screen formed within the sensor pod housing and the connecting assembly.

5. The warning indicator system of claim 1, wherein the one or more caret arrows are configured to progressively flash, to flash between on and off, to flash between different colors, to be constantly on, or any combination thereof.

6. The warning indicator system of claim 1, wherein the one or more caret arrows comprises a plurality of caret arrows that are constant in size along the connecting assembly and increase in a size along a width of the sensor pod housing.

7. The warning indicator system of claim 1, wherein the one or more caret arrows comprises a plurality of caret arrows that are constant in size along the connecting assembly and along the sensor pod housing.

8. The warning indicator system of claim 1, wherein the one or more caret arrows comprises a plurality of caret arrows that increase in a size along the connecting assembly and along a width of the sensor pod housing, wherein a first caret arrow at a location nearest to the autonomous vehicle is the smallest of all of the plurality of caret arrows and a second caret arrow at a location farthest from the autonomous vehicle is the largest of all of the plurality of caret arrows.

9. The warning indicator system of claim 1, wherein the one or more caret arrows comprises a plurality of caret arrows that progressively flash from a location nearest to the autonomous vehicle to a location farthest from the autonomous vehicle.

10. The warning indicator system of claim 1, wherein the warning indicator is configured to progressively flash, to flash between on and off, to flash between different colors, to be constantly on, or any combination thereof.

11. The warning indicator system of claim 1, wherein the warning indicator is configured to have a predetermined color pattern and a predetermined light effect, and wherein the predetermined color pattern and the predetermined light effect are based on a combination of the stopped condition of the autonomous vehicle and the other vehicles and persons.

12. The warning indicator system of claim 11, wherein the warning indicator changes at least one of the predetermined color pattern and the predetermined light effect from a first state to a second state based upon the distance between the autonomous vehicle and the other vehicle and persons.

13. The warning indicator system of claim 1, wherein the warning indicator does not include deployed hardware.

14. The warning indicator system of claim 1, wherein the warning indicator is continuously activated for an entirety of the stopped condition.

15. The warning indicator system of claim 1, wherein the sensor pod comprises a driver side sensor pod and a passenger side sensor pod, and wherein the warning indicator comprises a driver side warning indicator associated with the driver side sensor pod and a passenger side warning indicator associated with the passenger side sensor pod.

16. The warning indicator system of claim 15, wherein the driver side warning indicator and the passenger side warning indicator are selectively actuated based on the stopped condition of the autonomous vehicle.

17. The warning indicator system of claim 16, wherein the sensor comprises one or more of one or more lidars, one or more radars, and one or more cameras, and wherein the warning indicator is configured to be activated based on data received from the sensor.

18. The warning indicator system of claim 16, wherein the sensor detects the stopped condition of the autonomous vehicle.

19. An autonomous vehicle comprising:
  a sensor pod having:
    a sensor; and
    a sensor pod housing;
    a connecting assembly configured to couple the sensor pod to the autonomous vehicle; and
  a warning indicator associated with the sensor pod and the connecting assembly, the warning indicator configured to alert other vehicles and persons to a stopped condition of the autonomous vehicle,
  wherein the warning indicator comprises one or more caret arrows oriented in a direction facing outward from the autonomous vehicle, and
  wherein the warning indicator is configured to have a predetermined color pattern and a predetermined light effect, and wherein the predetermined color pattern and the predetermined light effect are based on a combination of the stopped condition of the autonomous vehicle and the other vehicles and persons.

20. The autonomous vehicle of claim 19, wherein the warning indicator comprises a plurality of LEDs or an LED screen coupled to or formed within the sensor pod housing and the connecting assembly.

21. The autonomous vehicle of claim 19, wherein the warning indicator is configured to progressively flash, to flash between on and off, to flash between different colors, to be constantly on, or any combination thereof.

22. The autonomous vehicle of claim 19, wherein the warning indicator changes at least one of the predetermined color pattern and the predetermined light effect from a first state to a second state based upon the distance between the autonomous vehicle and the other vehicle and persons.

23. The autonomous vehicle of claim 19, wherein the warning indicator extends to a maximum allowable width of the autonomous vehicle.

24. The autonomous vehicle of claim 19, wherein the warning indicator is continuously activated for an entirety of the stopped condition.

25. The autonomous vehicle of claim 19, wherein the sensor pod comprises a driver side sensor pod and a passenger side sensor pod, and wherein the warning indicator comprises a driver side warning indicator associated with the driver side sensor pod and a passenger side warning indicator associated with the passenger side sensor pod.

26. The autonomous vehicle of claim 25, wherein the driver side warning indicator and the passenger side warning indicator are selectively actuated based on the stopped condition of the autonomous vehicle.

27. The autonomous vehicle of claim 19, wherein the sensor comprises one or more of one or more lidars, one or more radars, and one or more cameras, and wherein the warning indicator is configured to be activated based on data received from the sensor.

28. The autonomous vehicle of claim 27, wherein the sensor detects the stopped condition of the autonomous vehicle.

* * * * *